United States Patent [19]

Lerman

[11] Patent Number: 5,397,581
[45] Date of Patent: Mar. 14, 1995

[54] MEANS FOR CONTINUOUS CONFECTIONERY COATING OF EDIBLE CENTERS

[76] Inventor: Russell E. Lerman, P.O. Box 451, Dover, N.J. 07802

[21] Appl. No.: 14,262

[22] Filed: Feb. 5, 1993

[51] Int. Cl.⁶ ............................................. A23G 3/00
[52] U.S. Cl. .................................. 426/231; 426/306; 426/307
[58] Field of Search ............... 426/302, 305, 306, 307, 426/231; 118/19, 24

[56] References Cited

U.S. PATENT DOCUMENTS

| | | | |
|---|---|---|---|
| 2,945,764 | 7/1960 | Lanz | 426/302 |
| 3,046,143 | 7/1962 | Lowe et al. | 426/307 |
| 3,470,831 | 10/1969 | von Drachenfels | 426/306 |
| 3,958,018 | 5/1976 | Tay | 426/307 |
| 4,032,667 | 6/1977 | Kreuter | 426/306 |
| 4,431,678 | 2/1984 | Sollich | 426/306 |
| 4,764,329 | 8/1988 | Lerman | 264/8 |
| 4,773,244 | 9/1988 | Honda et al. | 118/320 |

OTHER PUBLICATIONS

Raisin Confections, The Manufacturing Confectioner, Jun. 1990, pp. 74–77.
Minifi, B., Chocolate Manufacture, Chocolate, Cocoa and Confectionery, AVI Publishing Co., Inc., West Point. Conn. (1982).
Latini, Coating and Polishing Revolving Pans.
Matz Cookie and Cracker Technology, Second Edition, pp. 207–211.

Primary Examiner—George Yeung

[57] ABSTRACT

The present invention is a method and apparatus to coat an edible pellet with an edible coating composition having a melting temperature below that of the pellet. The method comprises forming a slurry of the pellets and the coating composition between the melting and set points of the coating composition. A rotatable member having a working surface is axially rotated. A stream of the slurry is directed to impinge on the working surface. Pellets coated with the edible coating are spun off of the working surface and cooled.

15 Claims, 1 Drawing Sheet

3,397,581

MEANS FOR CONTINUOUS CONFECTIONERY COATING OF EDIBLE CENTERS

BACKGROUND OF THE INVENTION

1. Field of the Invention

The present invention relates to an apparatus and method for the continuous production of edible coated pellets; and more particularly, to coated confectionery products.

2. Description of Related Art

Confections in globular form are typically manufactured having a solid center core such as nuts, fruits, such as raisins, or some other globular or pellet-shape which is coated with a layer of chocolate, cocoa, carob, yogurt or the like.

A commonly used coating process is a batch process known as panning, a process described by *Minifi, B., Chocolate Manufacture, Chocolate, Cocoa and Confectionery*, AVI Publishing Co., Inc., West Port, Conn. (1982). This is an inherently labor intensive, expensive process having a low production rate. Additionally, panning may require more than one cycle to get the desired coating coverage.

U.S. Pat. Nos. 3,470,831 and 4,032,667 disclose spraying apparatus for coating candy centers. U.S. Pat. Nos. 3,958,018 and 4,431,678 disclose dispensing molten chocolate over an irregularly-shaped candy center.

In processes to form coated, edible pellets it is often desirable and known to put a glaze coating over the initial chocolate, yogurt or carob coating. Such methods are known to be accomplished by similar means to coat candy as recited above. Additionally, it is known to pass pellets to be coated through an inclined cylinder-shaped apparatus containing the liquid glazing material. The coated pellets move from the top to the bottom during which time a glazing composition within the cylinder-type apparatus coats them. The glazed coated pellets are then fed to a conveyor belt where the glaze is dried.

*Raisin Confections, The Manufacturing Confectioner*, June 1990, pages 74–77 discloses the chocolate coating of raisins using panning procedures. After the coating the coated raisins can be glazed or polished with a finishing glaze. This is accomplished by returning the coated raisins to a clean pan and introducing polishing solution. Cold air is blown continuously after each glaze addition until the surface of the panned raisins is dried.

*Minifi, B., Chocolate Manufacture, Chocolate, Cocoa and Confectionery*, AVI Publishing Co., Inc., West Port, Conn. (1982) discloses chocolate compositions as well as chocolate panning to coat nuts and raisins. There is disclosed that an example process contains the stages of pre-glazing, or sealing the nut surface with a thin coating of chocolate, chocolate coating finish glazing of the product. A useful coating machine is disclosed as a Thomas Accela-Cota, published as a brochure by Thomas Engineering, Inc. Another coating and polishing equipment is disclosed in the brochure by Latini, *Coating and Polishing Revolving Pans*.

Useful coating compositions are known in the art. See for example *Matz Cookie and Cracker Technology*, Second Edition, pages 207–211. Other useful coatings are disclosed in literature provided by the Merckens Chocolate Company of Mansfield, Mass.

SUMMARY OF THE INVENTION

The present invention relates to a method and apparatus to coat an edible pellet with an edible coating composition. The method comprises forming a molten slurry of the pellets in the coating composition between the melting and set points of the coating composition and below the melting point of the pellet. A rotatable member having a working surface is axially rotated. A stream of the slurry is then directed to impinge on the working surface of an axially rotatable member. Pellets coated with the edible coating are spun off of the working surface and cooled. At least the outer surface of the coated pellet is cooled to below the solidification temperature of the coating. The solidification temperature of the coating is also known as the set point. The coated pellets are collected and transported from the apparatus by a suitable means such as an enclosed conveyor belt and cooled.

The method can further comprise controlling the viscosity of the molten slurry to form a continuous film on the working surface and to form coated pellets of controlled and desired thickness upon spinning from the working surface. The viscosity can be controlled by controlling the temperature of the molten slurry between the melting and set points, controlling the composition of the coating, and controlling the temperature of the surface of the pellet. In a preferred embodiment the composition comprises a sufficient amount of fat to enable the composition to maintain a continuous film at a set point of from 65° F. to 85° F. The fat can be selected from any suitable fat used in edible compositions with a melting point between 100° F. and 125° F. Preferred fats include cocoa butter, and hydrogenated or partially hydrogenated oil, such as cotton seed oil, palm oil, coconut oil, soybean oil, corn oil, sunflower oil and the like.

The edible pellets can be any pellets which retain their form in the temperature range up to 125° F. Preferred pellets include fruit, nuts and candy. A preferred fruit is a raisin or dried blueberry.

The preferred edible coating compositions are selected from the group consisting of cocoa, chocolate, yogurt and carob compositions.

The present invention comprises an apparatus to coat an edible pellet with an edible coating composition. The apparatus comprises a rotatable member having a working surface and an axis. There is a means to rotate the rotatable member about the axis and a nozzle to direct a slurry of molten edible coating composition and edible pellets to impinge on the working surface. There can be a means to control the temperature of the working surface.

The apparatus can further comprise a suitable means to provide the slurry. In a preferred embodiment this comprises a melting tank and cooling tank communicating with the nozzle. Preferably the coating composition is maintained in the cooling tank and a stream of pellets joined with a stream of the molten coating composition are mixed and fed toward the nozzle.

In a preferred apparatus the working surface is a bell-shaped member symmetrical about a vertical axis and having an upper end and a lower end. The surface of the bell conically diverges from the axis toward a rim at the lower end.

The apparatus preferably comprises a housing in which the rotatable member is located. There is a means to control the temperature and humidity of the atmosphere within the housing to insure that the coated pellets are cooled as they leave the bell.

DETAILED DESCRIPTION OF THE INVENTION

Figures 1, 2, 3:
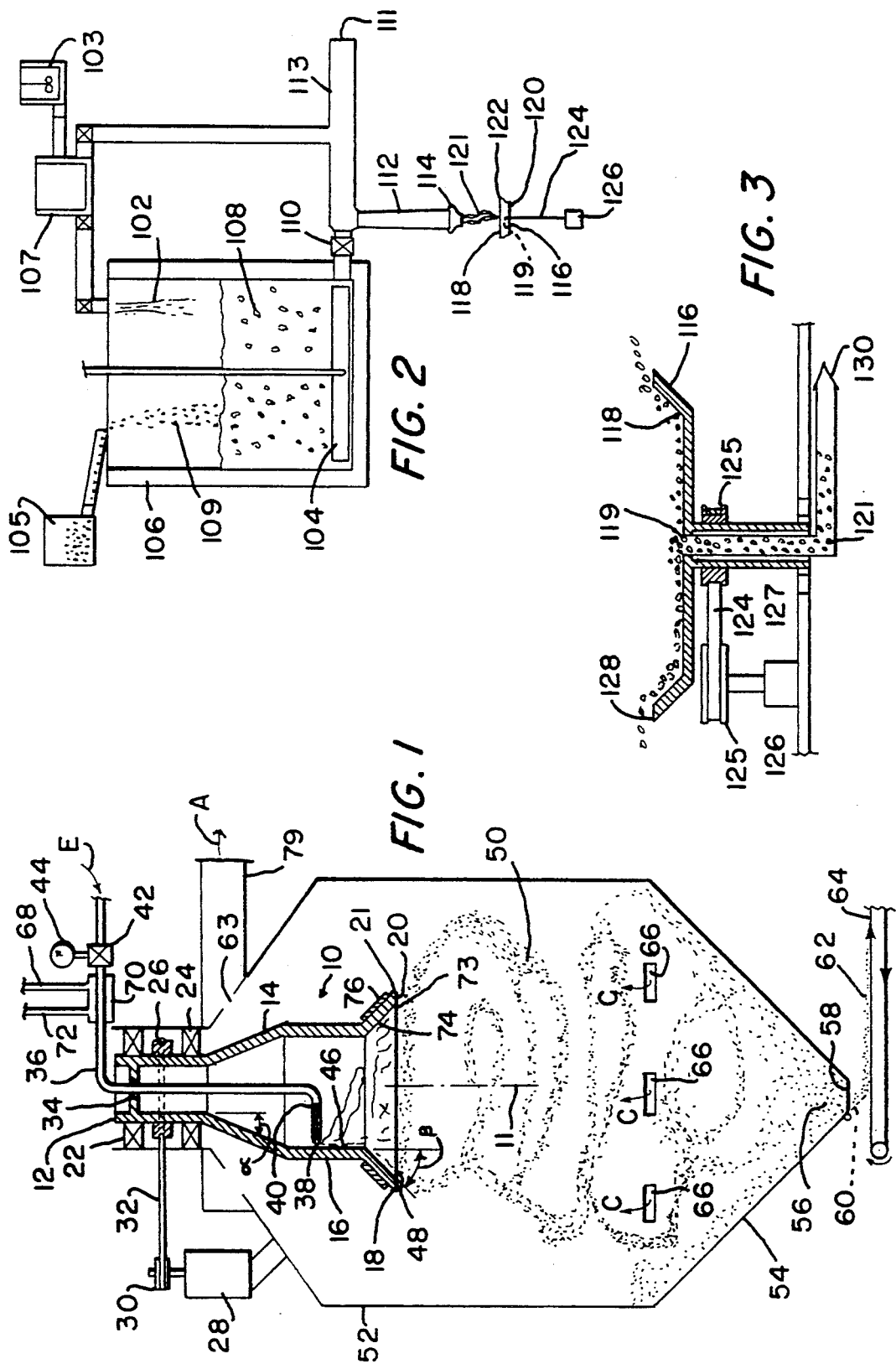
FIG. 1 is a partial cross sectional view of a preferred embodiment of the apparatus of the present invention.
FIG. 2 is a partial cross sectional view of another embodiment of the apparatus.
FIG. 3 is a partial cross sectional view of another embodiment of the apparatus.

The present invention will be understood by those skilled in the art by reference to FIGS. 1-3.

FIG. 1 illustrates a preferred apparatus of the present invention. This apparatus comprises a rotatable member, rotatable about a longitudinal center rotational axis 11.

The rotatable member is preferably disposed in upper part as housing 52, having a tapered hopper like base section 54, is provided with a plurality of cold air inlets 66 in its lower regions and a plurality of warm air outlets 63 in its upper regions. At the top of chamber 52 are provided preferably two journal bearings 22 and 24 disposed about vertical axis 11. Bearings 22 and 24, acting together, provide firm rotating support to a generally cylindrical bell-shaped member 10 open at both ends. In FIG. 1, for convenience, minute details of structure are omitted and bearings 22 and 24 are shown as closely fitting around an upright cylindrical portion 12 of rotating member 10. Cylindrical portion 12 also has mounted around it, preferably between bearings 22 and 24, a pulley 26 which is connected by an endless belt 32 to a pulley 30 of an electric drive motor 28 conveniently mounted at the top of housing 52. Electric motor 28 is preferably a variable speed electric motor rated according to the anticipated flow rate of slurry through the apparatus, as persons skilled in the art will readily appreciate.

The rotatable member preferably has an upper end 12 and a lower end 73 and comprises an inner working surface 74. The inner working surface 74 diverges from axis 11 moving from the upper end 12 to a rim 20 in the lower end 73. Preferably elongated axially symmetric rotatable member 10 has below first cylindrical portion 12, and contiguous therewith, a generally conical divergent mid-portion 14 which at its lower end is contiguous with a second cylindrical portion 16. The lower end of cylindrical portion 16 is contiguous with a second divergent flared-out generally conical portion 18 which ends in a horizontal rim 20 with a sharp distal edge 21. The upper generally conical portion 14 has a substantial portion thereof inclined at an angle $\alpha$ to the rotation axis and, likewise, lower generally conical portion 18 has a substantial portion thereof inclined at an angle $\beta$ to its local vertical.

Although FIG. 1 shows the various portions 12, 14, 16 and 18 as clearly cylindrical or conical, in actuality these portions may blend into each other or form a single contiguous surface with progressively larger diameters from top portion 12 toward lower portion 18, with rim 20 having the largest diameter of the inner surface of rotating member 10.

As shown in FIG. 1, operation of drive motor 28, through belt 32, will rotate member 10 about its vertical center axis 11 inside the upper end of elongate generally closed member 52. A slurry of edible pellets and coating material in a molten state (by heating), as indicated by arrow E, flows from a source thereof (not shown) through pipe 36 via a control valve 42 into the center of rotating member 10. A flow gauge 44 may conveniently be provided with control valve 42 to monitor the flow rate of incoming slurry material. Pipe 36 at its lowest end is bent to have a section 40 oriented horizontally and ending in an orifice 38 close to the inside surface of cylindrical portion 16 of rotating member 10.

In general, the process should be contained in a temperature and humidity controlled environment wherein the relative humidity is less than 50% and the temperature is from about 40° to 90° F., and more preferably 35° to 40° F. within chamber 52 at 20% to 35% relative humidity.

It may be desirable under certain conditions, e.g., in very cold weather with a long pipe 36, to provide additional heat to the molten slurry flow E. This may easily be accomplished by providing a controlled flow of hot water, for example, via an inlet pipe 68 to a water jacket 70 surrounding the molten slurry pipe portion proximate rotating member 10, with this heated water flowing back out via an outlet pipe 72. It is preferred to have a means to control the temperature of the working surface 74. A preferred means is a heating jacket 76 to maintain the temperature of the working surface 74 above the melting temperatures of the coating composition.

Chamber 52 is provided with a bottom cover 58, hinged to one side, which may be rotated to an open position 60, as indicated by phantom lines in FIG. 1.

Between slurry inlet pipe 36 and the upper cylindrical portion 12 of rotating member 10 is provided a seal 34, to prevent any inadvertent flow of slurry material from chamber 52 to the vicinity of electric motor 28. This is a measure intended to prevent the introduction of air pollutants to the interior of chamber 10. Seal 34 can have any of several configurations known to the prior art for such seals between a stationary central member and a coaxially rotating outer member.

Operation of a preferred embodiment of the apparatus of this invention for use with molten slurry flow E will now be described.

Chamber 52 is opened at the bottom by opening of cover 58 and cool air vents 66 are opened to allow the ingress of cooling air as indicated by arrows C. This creates a curtain of cooling air. Motor 28 is actuated to rotate rotating member 10 at a predetermined controlled speed. At this point, the rotation of the lower conical portion 18 of rotating member 10 will generate air currents tending to flow in an outwardly directed spiral so that air flows downward along the inner surface of chamber 52 and back up again through the central portion thereof and out exit 79 as denoted by arrow A. Molten slurry material flow E into pipe 36 is now permitted by means of control valve 42, at a rate monitored on gauge 44. Molten slurry material E, which is free flowing in its molten state, continuously flows through the lower portion 40 of pipe 36 and through orifice 38. Thereafter, the slurry fed from nozzle orifice 38 impacts the inner cylindrical wall surface 46 of portion 16 and is held there momentarily by centrifugal force and then under the combined action of gravitational and centrifugal forces, the slurry forms an elongate moving string in a spiral pattern along the inner surface of cylindrical portion 16 of rotating member 10. The flow eventually reaches lower conical portion 18 and spins off rim 20 as a free flowing spiral.

Depending on the solid to liquid ratios, rotational speed of rotating member 10, the diameter of rim 20, and the viscosity of the flowing molten slurry, this flung-off flow 48 of material will form either a thin sheet, spiraling strands, or small droplets of the coating composition and coated pellets, or only coated pellets. Persons skilled in the art, with minimal experimentation, can determine which rate of slurry flow E, motor rotational speed, and diameter of rim 20 are appropriate to form the desired size of globular product. Chamber 52 temperature is preferred from 35° to 70° F. and less than 50% relative humidity for the congealing and coating process to proceed effectively.

Illustratively, using chocolate as the molten material, a range of from 2000 to 4000 pounds per hour for flow rate E, a rotation of from 300 to 600 RPM for element 10, and a diameter of 7½ inches for rim 20, can be used to produce acceptable coated pellets for most applications.

As rotation proceeds, the spun off coated pellets 48 fall in a spiraling pattern 50 through the air within chamber 52 to area 56 above cover 58. A free fall through approximately 12 feet of cool air is adequate to cause at least the outer surface of coating material to solidify. The outflow 62 of coated pellets through open cover 58 preferably onto a vibrating-belt type conveyor 64 that separates the congealed coating composition droplets from the coated pellets causing the droplets to fall through the opening in the belt. The product is then conveyed and further cooled in a cooling tunnel for further processing as appropriate.

As persons skilled in the art will appreciate, if the apparatus is used continually over a prolonged period of time, it will be necessary to allow a substantial flow of cooling air to remove the heat from the molten slurry. Because heated air has a lower density than cooler air, there will be a natural convection of this warmed air upward through chamber 52, and out through openings 63 into duct 79, as indicated by arrow A. This outflow of hot air A may conveniently be directed through filtering elements or directly to a stack of conventional design (not shown). In practice, therefore, a steady state operating situation can soon be established in which the coated pellets 62 can be sampled to ensure that its size is within the acceptable range. Any adjustments that have to be made to the flow rate of molten slurry, rotational speed of motor 28, and the amount of air flowing through chamber 52, can easily be affected by an operator or by preprogrammed computerized controls.

The apparatus of this invention and its method of use permit the continuous processing of substantial amounts of coating composition and pellets into coated pellets of a size that can be easily controlled by parameters such as flow rate, initial coating temperature, and the rotational speed of motor 28. The method thus provides continual operation for high volume throughput of confectionery material.

An alternate embodiment of the apparatus of the present invention is illustrated in FIG. 2. This apparatus is similar to that in FIG. 1 except that the nozzle feeds a stream of molten slurry to the working surface of a spinning cup. The working surface is the inside surface of the cup. As the cup spins, an archimedes spiral of the coated pellets is spun toward the rim of the cup and discrete coated pellets are spun from the cup.

Referring to FIG. 2, there is a mixing tank 102 in which the coating composition 108 is maintained just above the set point temperature. The tank preferably contains a mixing means, such as rotating paddle 104. Preferably the tank contains a means to control the temperature. Such means can be a jacket 106 surrounding the tank. Suitable heating means can be within the jacket including water pipe, electrical resistance wiring, or the like. The pellets 109 are fed to tank 102 from tank 105 and the coating is fed from cooling tank 107 coupled to coasting source 103. In yet an alternate embodiment, a continuous stream of the pellets 111 can be thoroughly wetted in a suitable mixing means 113 with the molten coating composition continuously fed from tank 107, outside of tank 102 prior to entering the nozzle 114.

In the embodiment shown in FIG. 2 a slurry 108 is maintained in the tank 102. The tank 102 communicates through a heated ball valve 110 to a pipe section 112 which leads to nozzle 114. The nozzle 114 is directed toward a spinning cup 116. The spinning cup 116 has an inside surface 118, an outer surface 120 and a rim 122. Preferably, the cup 116 is symmetrical with the inner surface 118 facing toward nozzle 114. The slurry stream 121 from the nozzle is preferably directed to the center 119 of the cup. There is a suitable means such as a motorized spinning rod 124 connected to the spinning cup 116 to axially spin the cup. The spinning rod is rotated by a suitable means such as motor 126. Preferably, there is a means to provide a flow of air draft opposite the dropping mixture. The air can be at 35° F. to 40° F. The flow rate is preferably from 500 to 1000 ft³/min.

FIG. 3 shows yet another embodiment of the apparatus. In this embodiment, rather than having the nozzle 114 direct a stream of slurry 121 toward the center 119 of the cup, a nozzle 130 can direct a slurry 121 through the bottom to the center 119 of inner working surface 118 of the rotating cup 116. The nozzle 130 is inserted through a hollow shaft 127 which is driven by the combination of a motor 126, two pulleys 125 and a belt 124.

As the cup 116 rotates, the slurry 121 evolves into a spiral pattern and moves by centrifugal force along the inside walls of the inner working surface 118 and are spun off at the rim 128 as discrete coated pellets.

In operation, a molten slurry of coating composition and edible pellets pass from the nozzle 130 to the inner surface 118 of the spinning cup 116. The centrifugal forces causes the molten slurry to move along the inside surface 118 toward the rim 128. The rate of rotation of the cup, taking into consideration the viscosity of the slurry, is controlled by a variable speed motor 126 to result in coated edible pellets being spun from the rim 128.

It has been found that droplets of coating composition, as well as coated pellets may form. The coated pellets drop at a further distance from the rotating cup than the droplets of coating composition. Each can be separately collected, for example, by a circular conveyor placed at the appropriate distance. The conveyor then transmits a continuous flow of coated pellets through a cooling tunnel. The coated pellets are the final product and the solidified droplets of coating composition can be recycled to melting tank 103.

The present invention includes as method of operation to coat an edible pellet with an edible coating composition. The edible coating composition preferably has a melting temperature below that of the pellet. In this embodiment the composition can be coated on the pellet and subsequently cooled so that the final product is a solid coated pellet. It is recognized that this method and apparatus can be used where solidification takes place by drying rather than cooling. This can be useful for glazing edible pellets as well as glazing edible coated pellets.

The spray congealing method comprises forming a slurry of pellets in the coating composition between the melting and set points of the composition. This can be accomplished by mixing the coating composition and the pellets together in a mixing tank which is continually stirred to wet the surface area of the pellets within the coating composition fed from the cooling tank. The slurry is fed preferably as a continuous stream to the working surface of an axially rotatable member such as bell-shaped member 10 shown in FIG. 1, or spinning cup 116 shown in FIGS. 2 and 3. The slurry forms a layer over the working surface. The working surface carried the slurry by centrifugal force away from the axis. The slurry is thrown from the working surface preferably from the rim in the form of coated pellets. The coated pellets are thrown from the working surface to a cooler environment wherein the coating cools at least on the outside to give integrity to the coated pellet. In accomplishing the formation of the coated pellets it is preferred to control the process to attain a spiral of coated pellets or alternatively a film of slurry on the working surface of the rotatable member. As the film or spiral traverses the working surface, discrete coated pellets are formed. The coated pellets are spun off into a controlled environment having a relative humidity from 20 to 35% and a temperature which is about 35° F.

The process can be controlled to form a film on the working surface by controlling the viscosity of the coating. The viscosity of the coating can also be controlled to attain coatings of desired thickness. The speed of rotation of the cup and drop distance from the cup 116 can be varied to control the thickness. The viscosity can be controlled by controlling the temperature of the molten slurry or by controlling the temperature of the working surface. Where the viscosity is controlled by controlling the composition of the coating, the composition can be altered by various ingredients. It is preferred that the composition contains a sufficient quantity of fat to enable it to form a continuous film at from 65° F. to 90° F. The fat can be any suitable fat used in coating compositions. Useful fats include cocoa butter, hydrogenated or partially hydrogenated corn oil, sunflower oil, palm oil, coconut oil, cottonseed oil, and soybean oil, and fractionated palm kernel oil.

Pellets useful in the present invention consist of nuts, fruit and candy having a melting temperature greater than the melting temperature of the coating composition. Preferred nuts are peanuts, cashews, walnuts, filberts and the like. Preferred fruit include raisins and dried blueberries. The coating composition can be selected from the group including cocoa, chocolate, yogurt and carob compositions. Useful compositions are disclosed in the Background of the Invention. Preferred compositions include all kinds of chocolate compositions which include from 20 to 60% natural chocolate liquor, from 20 to 60% sugar and from 10 to 30% of cocoa butter. Cocoa or compound compositions may include from 10 to 40% hardened vegetable oil, from 25 to 50% sugar, from 0 to 20% non-fat dry milk, and from 5 to 25% natural cocoa.

The temperature difference between the pellets, that are provided from tank 105 shown in FIG. 2, and the coating, which is supplied from cooling tank 107, may vary. Preferably the pellets are at a lower temperature than the coating. A useful pellet temperature is about 35° F. and the set point of the coating material ranges from 65° to 90° F. preferably at about 80° F.

The apparatus of the present invention can also be used to spray dry coatings initially in liquid form, onto solid edible pellets. These coating compositions are such that after application at least the outer surface and preferably the whole layer dries to form a solid coating. This is particularly useful in applying thin glazing compounds to edible pellets. More particularly, it is useful to coat edible pellets having the edible coating compositions as recited above. Referring to FIG. 1, a slurry comprising the solid coated pellets and the liquid glazing composition is fed from nozzle orifice 38 to the inner working surface 74 of rotating member 10. The viscosity of the glazing composition, taken in combination with processing conditions such as the rate of rotation of the working surface, can be used to determine the thickness of the coat of the glazing composition. The pellets coated with glazing composition then fall through air in chamber 52. The relative humidity and temperature in the air can be used to dry at least the outer surface of the glazed composition as it falls from the rotating member 10 toward the bottom of the chamber 52. Preferably, the relative humidity is lower than 50%, and more preferably lower than 20%. In this way the outer glazing can be dried. The temperature can be as high as possible without adversely affecting the coated pellets. Preferred temperatures are no higher than from room temperature up to about 75° F. with a preferred temperature being from 40° to 60° F. for this drying operation.

The dried pellets are then collected in the same manner as the coated pellets recited above.

The following example illustrates the practice of the present invention. The example should not be construed as limiting the invention to anything less than that which is disclosed or which would have been obvious to one of ordinary skill in the art therefrom. Percents and parts are by weight unless otherwise indicated.

EXAMPLE 1

A trial run was made using peanuts and the apparatus shown in FIG. 2. The run was made with molten chocolate coating separately fed to a mixing tank at 90° F. and peanuts cooled to about 35° F. There is sufficient coating material to form a free flowing slurry. The slurry dropped about 3 inches from coupling 114 onto cup 116. There was an updraft of air at 35° F. and 850 ft$^3$/min. The spinning cup was 6 inches in diameter with a rim about ¾ inch. This cup was continuously heated and composed of stainless steel coated with Teflon. A film of coating composition was first applied to the cup which was maintained at a temperature of 90° F. Rates were adjusted to maintain a coating film on the cup. The coated nuts dropped about 3 to 4 feet during which the surface solidified and were collected.

Based on the above results it is apparent that most commonly used existing chocolate coatings and coating materials can be used by controlling the viscosity. Where the composition is controlled the viscosity can be affected by the fat content. Where a composition is commercially supplied it is not desirable to affect the fat content or change the fat content for processing purposes. The viscosity can be affected by changing the temperature of the composition, as well as affecting the temperature of the working surface. In the above case, the coating was commercially supplied and the composition was not altered. By varying the processing conditions, including the temperatures as well as the rotation speed, coated pellets have been made.

While the invention has been described with reference to the preferred embodiment thereof, it will be appreciated by those of ordinary skill in the art that modifications can be made to the structure and elements of the invention without departing from the spirit and scope of the invention as a whole.

What is claimed is:

1. A method for coating edible pellets with an edible coating composition comprising the steps of:

forming a molten slurry of the pellets and the coating at a temperature above a solidification temperature of the coating composition;

directing a stream of the molten slurry so as to impinge on a working surface of an axially rotatable member;

spinning the working surface wherein the coated pellets are propelled from the working surface;

solidifying the coating of the pellet; and collecting the coated pellets.

2. The method as recited in claim 1 wherein the coating composition has a melting temperature below that of the pellet wherein the step of solidifying further comprises cooling at least a surface layer of the coated pellets to below the set point temperature of the coating.

3. The method as recited in claim 2 further comprising the step of:

controlling the viscosity of the coating to form a continuous film on the working surface and to form coated pellets of desired thickness upon spinning off of the working surface.

4. The method as recited in claim 3 wherein the viscosity is controlled by controlling the temperature of the molten slurry.

5. The method as recited in claim 3 wherein the viscosity is controlled by controlling a fat composition of the coating.

6. The method as recited in claim 2 further comprising the step of:

controlling the temperature of the working surface.

7. The method as recited in claim 2 wherein the composition comprises a sufficient amount of edible fat to enable the composition to form a continuous film at from 65° F. to 90° F.

8. The method as recited in claim 7 wherein the fat is selected from the group consisting of cocoa butter, hydrogenated oil and partially hydrogenated oil.

9. The method as recited in claim 2 wherein the pellets are selected from the group consisting of nuts, fruit, and candy having a melting temperature greater than the melting temperature of the coating composition.

10. The method as recited in claim 9 wherein the fruit comprises raisins.

11. The method as recited in claim 2 wherein the coating composition is selected from the group consisting of cocoa, chocolate, yogurt and carob compositions.

12. The method as recited in claim 2 wherein the stream is in the form of a film.

13. The method as recited in claim 2 wherein the stream is continuous.

14. The method as recited in claim 1 wherein the solidifying of the coating of the pellet further comprises the step of:

solidifying the coating composition by evaporating a liquid carrier with a coating composition.

15. The method as recited in claim 14 wherein the liquid coating composition is a glazing composition.

* * * * *